United States Patent [19]

Shimizu

[11] Patent Number: 4,681,525
[45] Date of Patent: Jul. 21, 1987

[54] APPARATUS FOR MOLDING PLASTIC PRODUCTS

[75] Inventor: Shoji Shimizu, Ohta, Japan

[73] Assignee: Excell Corporation, Tokyo, Japan

[21] Appl. No.: 778,663

[22] Filed: Sep. 23, 1985

Related U.S. Application Data

[60] Division of Ser. No. 494,693, May 18, 1983, Pat. No. 4,550,008, which is a continuation-in-part of Ser. No. 273,396, Jun. 15, 1981, abandoned.

[51] Int. Cl.⁴ .................. B29C 17/07; B29C 17/12
[52] U.S. Cl. .................................. 425/527; 264/159
[58] Field of Search ............ 264/527, 529, 515, 523, 264/531, 130, 540–543, 150, 157, 163, 536, 159; 425/97, 527

[56] References Cited

U.S. PATENT DOCUMENTS 3,183,288  5/1965  Taylor et al. .................. 264/130
3,579,622  5/1971  Shaw et al. .................... 264/540

FOREIGN PATENT DOCUMENTS 45-16838  6/1970  Japan .......................... 264/527

Primary Examiner—Jay H. Woo
Assistant Examiner—Timothy W. Heitbrink
Attorney, Agent, or Firm—Franklin D. Wolffe; Morris Fidelman

[57] ABSTRACT

Apparatus for molding plastic products of virtually any complicated configuration is provided. When a parison is extruded out of a nozzle, a separating agent, preferably oil, is supplied into the parison as a lubricant. Since a thin film of the separating agent is formed on the inside surface of the parison, portions of the inside surface do not stick together even if they are brought into contact from some reasons. This insures to mold a plastic product of a very complex configuration. Use of a separating agent also allows to form sheet-type products by dividing the parison into several sections as desired. This is a very efficient way of forming sheet-type products since at least two may be formed at the same time.

6 Claims, 5 Drawing Figures

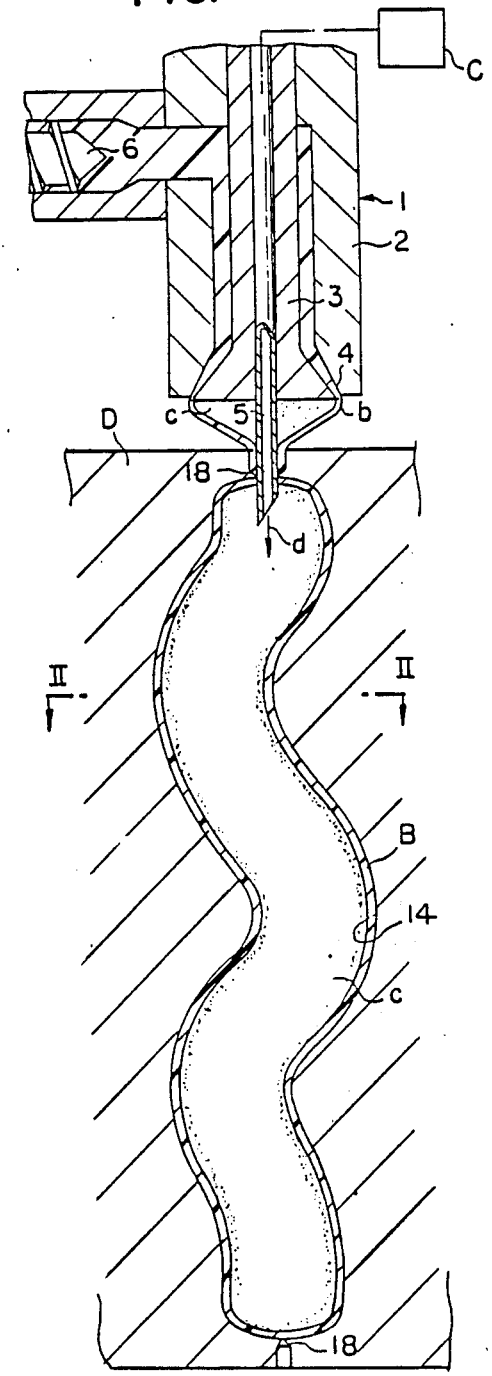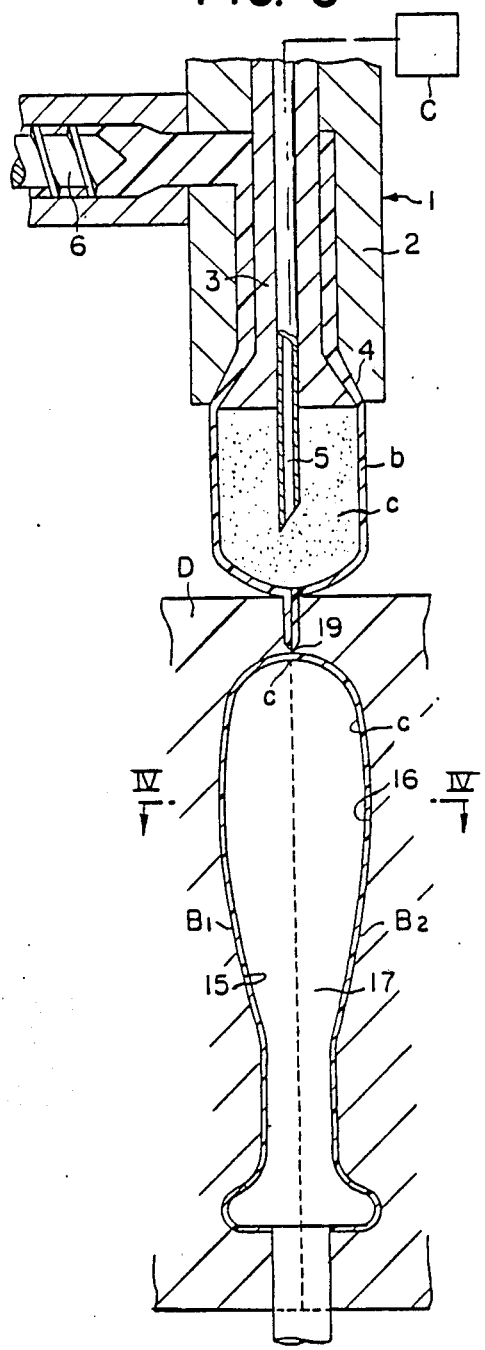
FIG. 1
FIG. 3

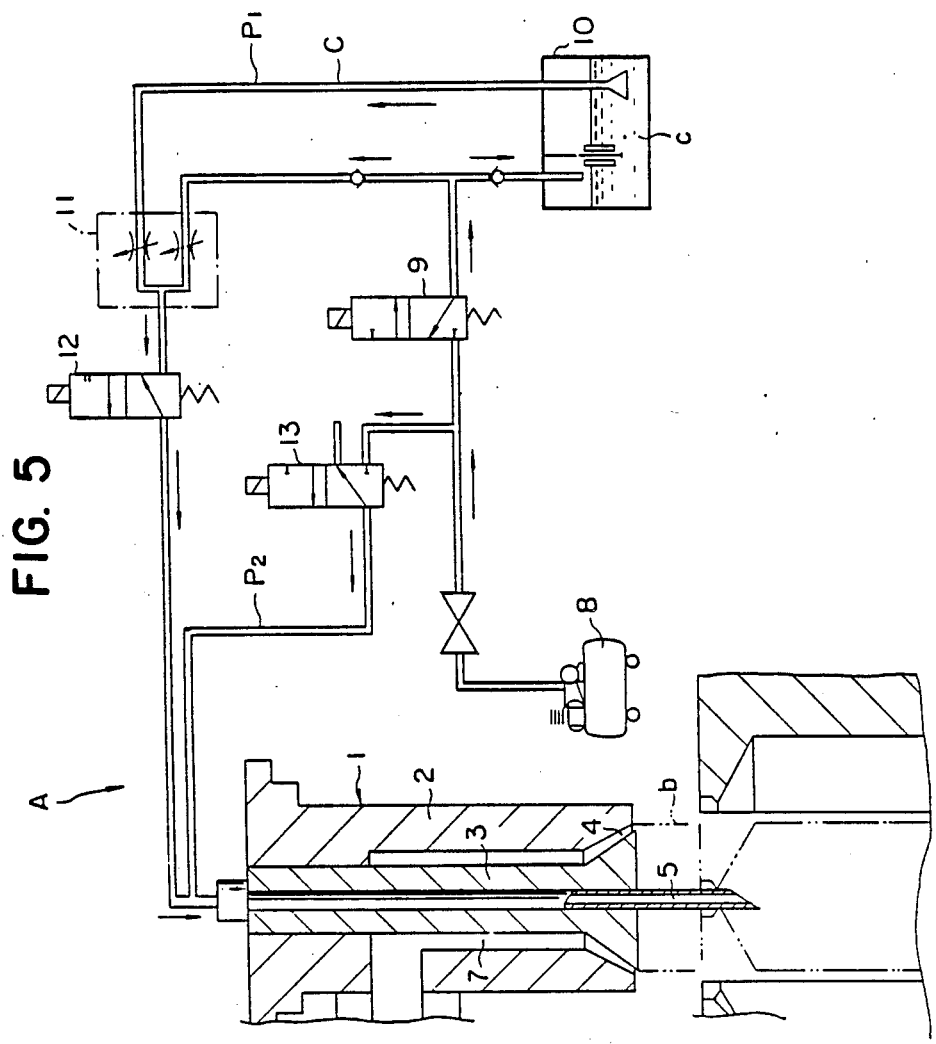
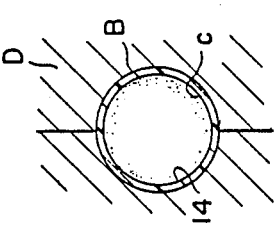
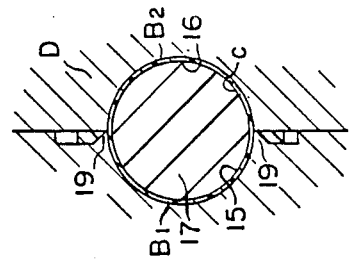

APPARATUS FOR MOLDING PLASTIC PRODUCTS

CROSS-REFERENCES TO RELATED APPLICATIONS

This is a divisional of application Ser. No. 494,693, filed May 18, 1983, now U.S. Pat. No. 4,550,008 which is a continuation-in-part application of the parent application, Ser. No. 06/273,396, filed on June 15, 1981, now abandoned.

BACKGROUND OF THE INVENTION

1. Field of the Invention

This invention relates to a method and apparatus for molding plastic products, and, more in particular, to a method and apparatus for molding plastic products, which are suitable for manufacturing plastic products of complicated configuration and/or which are suitable for manufacturing sheet-type products with increased efficiency.

2. Description of the Prior Art

It has been common practice to fabricate products such as a pipe to be used as an air duct for a ventilation or cooling device, or an inner surface cover of the door of an automobile, etc. from thermal plastic resin materials like polyethylene, polypropylene and the like. In fabricating a plastic pipe of thermal plastic resin, blow molding may be advantageously employed, but if a pipe to be fabricated is complicated in configuration with acute bends and/or sudden area changes, then, there is a problem of sticking of opposing inside surface portions of a parison when placed in a mold cavity. The prior art technology did not propose any solution to this problem so that there was a limitation in complexity and size of a plastic tube to be manufactured by blow molding.

It has also been common practice to employ the conventional vacuum forming technology if one was interested in fabricating sheet-type plastic products. In accordance with the vacuum forming technology, a plastic sheet material is placed on a mold having a defined shape and, upon application of heat, the sheet material is drawn down into the mold by vacuum thereby fabricating a sheet-type plastic product having a desired shape. However, this prior art technology is disadvantageous in that it requires trimming after shaping which is quite time-consuming. Moreover, the larger the surface area of and/or the thinner the thickness of a product to be fabricated, the more difficult to apply vacuum forming with requiring a large capacity vacuum unit. It is also to be noted that the conventional vacuum forming technology basically provides for fabrication of sheet-type products one at a time.

SUMMARY OF THE INVENTION

The disadvantages of the prior art are overcome with the present invention and an improved method and apparatus for fabricating a plastic product of virtually any complicated configuration is provided. The present invention is also applied to fabricate sheet-type products of virtually any desired shape with increased efficiency.

The present invention, in principle, employs a blow molding process; but it is characterized by using a separating agent which is blown into a parison, which is placed in a mold cavity, together with pressurized gas for shape-forming. Preferably, use is made of oil, such as mineral oil, machine oil and water-soluble oil, as a separating agent. Since oil is blown into a parison together with pressurized gas in accordance with one embodiment of the present invention, a thin oil film is formed on the inside surface of the parison so that the opposing surface portions of the parison do not stick together even when they are brought into contact. Therefore, the oil film acts as a lubricating film and this provides for fabrication of a plastic duct of virtually any complicated configuration.

It should also be noted that the present invention provides for fabrication of a sheet-type plastic product with the use of blow molding. Briefly stated, in accordance with another embodiment of the present invention, use is made of a parison, and a pressurized gas is blown into the parison together with oil as a separating agent to form an intermediate product which is hollow in structure. Then the intermediate product is split into two or more final products with the help of the separating agent thereby producing two or more sheet-type products. This is quite advantageous partly because two or more sheet-type products are manufactured at the same time, each having either the same shape or a different shape, and partly because no time-consuming trimming step is required as in the prior vacuum forming art.

In accordance with one aspect of the present invention, there is provided a method for producing a plurality of sheet-type plastic products at the same time out of a single parison by means of blow molding comprising the steps of: extruding a parison out of a nozzle while supplying a pressurized gas at a first pressure level and a separating agent into the interior of said parison thereby forming a thin film of separating agent along the inside surface of said parison; assembling a plurality of mold sections around said parison to place said parison in the mold cavity defined by the assembled mold sections, each of said mold sections having a predetermined molding surface and being so structured that a flash-forming recess is defined along the joint line between the two adjacent mold sections when assembled; supplying a pressurized gas at a second pressure level into said parison thereby pneumatically pressing said parison against the molding surface of each of said assembled mold sections to carry out shaping whereby part of said parison is pushed into said recess to form a flash having a film of separating agent extending from the inside surface of said parison; cooling said parison thus shaped to a predetermined temperature; disassembling said plurality of mold sections when said shaped parison is hardened to possess the ability to maintain its shape; and removing said flash, if any, from said shaped parison thereby producing a plurality of sheet-type products out of said parison.

In accordance with another aspect of the present invention, there is provided an apparatus for producing a plurality of sheet-type plastic products at the same time out of a single parison by means of blow molding, comprising: a nozzle for discharging a parison with an intended diameter; means for supplying a parison material to said nozzle; means for supplying a pressurized gas into the interior of said parison, the pressure level of said pressurized gas being adjustable at different levels; means for supplying a separating agent into the interior of said parison thereby forming a thin film of separating agent along the inside surface of said parison; and a plurality of mold sections which may be assembled to define a mold cavity, each of said mold sections having a predetermined molding surface and being so structured that a flash-forming recess is defined along the joint line between the two adjacent mold sections when assembled.

Therefore, it is an object of the present invention to provide a method and apparatus enabling to fabricate plastic pipes of virtually any complicated configuration.

It is another object of the present invention to provide a method and apparatus for fabricating sheet-type plastic products with ease and with increased efficiency.

It is a further object of the present invention to provide a method and apparatus for fabricating plastic products with smooth surface and uniform thickness.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration in cross-section of a molding apparatus in accordance with one embodiment of the present invention;

FIG. 2 is a cross-section taken along line II—II in FIG. 1;

FIG. 3 is a schematic illustration in cross-section of a molding apparatus in accordance with another embodiment of the present invention;

FIG. 4 is a cross-section taken along line IV—IV in FIG. 3; and

FIG. 5 diagrammatically shows a system for supplying a pressurized gas and a separating agent into the parison.

DESCRIPTION OF THE PREFERRED EMBODIMENTS

Referring now to FIGS. 1 and 2, there is shown a plastic molding apparatus which constitutes one embodiment of the present invention. The disclosed molding apparatus includes a nozzle 1 comprised of an outer cylinder 2 and an inner cylinder 3. A discharge port 4 for discharging a parison b in the form of a hollow tube is defined at the bottom end of the nozzle 1 by the gap defined between the outer 2 and inner 3 cylinders. The inner cylinder 3 is provided with a conduit 5 which projects downwardly from the bottom of the inner cylinder 3.

A molten synthetic resin material such as polyethylene, polypropylene and the like is stored in a hopper (not shown) and the molten plastic material is fed by a screw feeder 6 to the nozzle 1 and the parison b is formed when the thus fed plastic material is discharged out of the nozzle 1. A supply source C for supplying a pressurized air and/or a separating agent, preferably oil, is fluiddynamically connected to the flow passage of the inner cylinder 3 as indicated in FIG. 1.

Positioned below the nozzle 1 is a mold D which has a mold cavity 14 defining a desired shape into which the parison b is to be formed. As shown in FIG. 2, the mold D is comprised of two mold halves which are detachably brought together to define the mold cavity 14 therebetween. These mold halves may be separated from each other for charging the parison b into the mold cavity 14 or for removing the molded plastic material B out of the mold cavity 14. The molded product B is in the form of a winding hollow tube and a projection 18 is provided at each end of easy handling, but these projections 18 are cut away to form a finished product.

It will now be easily understood that, as shown in FIG. 1, if a product to be molded is very complicated in configuration, e.g., having crooked portions and sudden area changes, it sometimes happens that the opposing portions of the inside surface of the parison b are brought into contact when the mold sections are closed about the parison. If such a contact occurs, the contacted portions tend to stick together so that the resulting product B has a deformed shape which is somewhat different from the shape of the mold cavity 14. However, in accordance with the present invention, oil is supplied into the parison b under control so that a thin film of oil is formed over the whole inside surface of the parison b. Thus, even if portions of the inside surface of the parison b are brought into contact, they do not stick together since the thin oil film on the inside surface functions as a lubricating film. Accordingly, this embodiment permits molding of a plastic pipe of virtually any complex configuration.

FIGS. 3 and 4 show another embodiment of the present invention where like numerals indicate like elements in relation to the first embodiment shown in FIGS. 1 and 2. The structure of the second embodiment is fundamentally the same as that of the first embodiment. Although this second embodiment is shown in FIGS. 3 and 4 to use a mold core 17, the core 17 may be preferably discarded as will be described later. One of the mold halves is provided with a continuous recess 19 at the mating surface along the mold groove 15. Since the mold core 17 has a center rod at the bottom, which is held between the mold halves to keep the mold core 17 in position within the mold cavity which is defined by the groove surfaces 15 and 16 of the respective mold halves, only one projection 19 formed by a flash is provided.

It should be noted that recess 19 is provided continuously along the joint line between the two mold halves so that a flash is intentionally formed along the joint line, with or without the core 17. Since an oil film is formed on the inside surface of the parison b, the flash formed along the recess 19 is not completely integrated into a single body. Thus, when the flash is removed after molding, the intermediate tubular product splits into two sheet-type final products $B_1$ and $B_2$. In this manner, sheet-type plastic products may be easily manufactured using the blow molding technique.

Now, explanation will be had with respect to the air and oil supply system C as shown in FIG. 5. The air and oil supply system C in combination with the nozzle 1 and the mold D forms the basic structure of the present molding apparatus A. The supply system C basically has two flow passages $P_1$ and $P_2$: passage $P_1$ extending between an oil reservoir 10, in which oil c as a separating agent is stored, and the conduit 5 and passage $P_2$ extending between a compressor 8 and the conduit 5. The flow passage $P_1$ includes an atomizer 11 and a solenoid valve 12 which opens or closes the passage $P_1$ in response to signals fed. The atomizer 11 is also connected to the compressor 8 through another solenoid valve 9 so that when a pressurized gas is fed to the atomizer 11, oil is sucked from the reservoir 10 and dispersed into the pressurized air in the form of fine droplets as the air is discharged out of the atomizer 11. Thus, the oil dispersed air may be fed into the parison b through the conduit 5. A returning flow passage is provided between the atomizer 11 and the reservoir 10 so that excessive oil may be advantageously collected for reuse.

On the other hand, the air flow passage $P_2$ includes a solenoid valve 13 which opens or closes the passage $P_2$ in response to signals fed. The passage $P_2$ supplies only a pressurized air into the parison b to carry out a blowing step. It is to be understood that the solenoid valves 9, 12 and 13 are appropriately actuated to insure that only either of the two passages $P_1$ and $P_2$ is operated at a time and not both at a time.

Regarding the operation of the first embodiment, mold halves of the mold D are separated from each other, and the parison b is continuously extended out of the nozzle 1 and placed along the mold groove of one mold half. Importantly, during extrusion of the parison b, the valves 9 and 12 are activated to keep the passage $P_1$ operative; whereas, the valve 13 is deactivated to keep the passage $P_2$ inoperative. Therefore, oil dispersed air is supplied into the parison b thereby forming a thin oil film on the inside surface of the parison b.

After positioning the parison b along the groove of one mold half, the supplies of the parison b and the oil dispersed air are disconnected and the other mold half is brought into contact to define the mold cavity 14. Thereafter, the valve 13 is activated to supply pressurized gas into the parison b inside the mold cavity 14 through the passage $P_1$ and the conduit 5. Thus, the parison b becomes inflated and forced against the inside wall surface of the mold cavity 14 thereby shaping of the parison b is carried out. Upon cooling to a predetermined temperature, where the product B possesses the ability to maintain its shape, utilizing the heat capacity of the mold D, the plastic product B is completed and the product B is removed from the mold D by separating the mold halves from each other.

It is to be noted that the disclosed shape in FIG. 1 is rather moderately crooked, and the present invention is more advantageously applied to the case where the shape is even more crooked or winding. In this sense, the present invention is particularly useful for the case where the shape includes smaller diameters and/or elongated sections. In accordance with the present invention, since a thin oil film is formed on the inside surface of the parison b, portions of the inside surface do not stick together even if they are brought into contact during the manufacturing process, thereby insuring production of a product of intended shape at all times.

Next, the operation of the second embodiment will be described in detail with reference to FIGS. 3, 4 and 5.

The mold halves of the mold D are separated from each other and positioned away from the mold core 17 which is placed in alignment with the nozzle 1. The parison b is extruded out of the nozzle 1 and at the same time the valves 9 and 12 are activated to supply the oil dispersed air into the parison b thereby forming a thin oil film on the inside surface thereof. Then the oil film coated parison b is fitted onto the mold core 17 to enclose the core 17 by the parison b. Then, the valves 9 and 12 are deactivated to stop the supply of oil dispersed air, and the supply of parison is also stopped.

Then the mold halves are fitted onto the mold core 17, covered with the parison b, under pressure such that a flash is formed along the recess 19 engraved along the joint line between the two mold halves. In the particular embodiment shown in FIG. 4, a knife edge is provided at the corner of the recess 19 so that the flash is torn off as the two mold halves are brought into contact under pressure. When the flash is torn off, there is formed a pair of sheet-type plastic products $B_1$ and $B_2$ which are separated from each other along the mold cavity. The products $B_1$ and $B_2$ do not stick together owing to the existence of a thin oil film therebetween. This indicates that two sheet-type products are formed at the same time. After cooling to a predetermined temperature with the use of the heat capacity of the mold D itself, the mold halves are separated from each other to remove the thus molded products $B_1$ and $B_2$.

It is to be noted that the two products $B_1$ and $B_2$ may have different shapes, though they are identical in shape in the above disclosed embodiment.

A modification of the above-described operation of the second embodiment will now be described with reference to FIGS. 4 and 5. This modification is the case in which the core 17 is not used, and this modified version is more preferred.

The mold halves of the mold D are initially disassembled, and the parison b is extruded out of the nozzle 1. At the same time, the valves 9 and 12 are activated to supply the oil dispersed air into the parison b at a first pressure level thereby forming a thin film of oil on the inside surface thereof. When the parison b has been extruded over a desired length, the valves 9 and 12 are deactivated to stop the supply of oil dispersed air, and, at the same time, the supply of parison is terminated.

Then, the mold halves are assembled to place the parison b inside a mold cavity defined by the thus assembled mold halves whereby a flash is formed along the flash-forming recess 19 provided in at least one of the mold halves, so that a flash having a film of separating agent extending from the inside surface of the parison is formed in the recess 19. Most preferably, a sharp knife edge is provided at the corner of the recess, as shown in FIG. 4, so that the flash may be torn off as the two mold halves are brought into intimate contact under pressure. It may be that the flash is not completely torn off even if a sharp knife edge is provided, but this does not present any grave problem. It is important that the flash include a film of oil so that when the flash is later removed from the parison, two or more products may be obtained.

Upon assembling of the mold halves, the valve 13 is opened to introduce the pressurized gas at a second level, which is higher than the first level, into the parison b now placed inside the mold cavity defined by the assembled mold halves through the passage $P_2$ and the conduit 5. As a result, the parison b becomes inflated and thus pneumatically pressed against the molding surface of each of the assembled mold halves to carry out shaping. In this instance, the flash of the parison b may be pushed further into the recess 19 depending on its shape and size.

Upon cooling to a predetermined temperature, where the product B possesses the shape holding ability, the mold halves are disassembled. If the flash still remains at this stage, the product B is a single entity. However, by removing the flash, there is formed a pair of sheet-type plastic products $B_1$ and $B_2$ which are separate from each other. It is to be noted that if the flash has already been torn off by the sharp knife edge, two products $B_1$ and $B_2$ which are separate from each other may be obtained immediately upon disassemblage of the mold halves. It will be appreciated that the presence of a flash is not a problem because it may be easily removed thanks to its particular structure of sandwiching a film of oil. In this modified method also, the two products $B_1$ and $B_2$ may have different shapes.

While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Apparatus for producing simultaneously a plurality of sheet-type plastic products out of a single parison by means of blow molding, comprising:

a nozzle for discharging a parison with an intended diameter;

means for supplying a parison material to said nozzle;

means for supplying a pressurized gas into the interior of said parison, the pressure level of said pressurized gas being adjustable at different levels;

means for supplying a separating agent into the interior of said parison thereby forming a thin film of separating agent along the inside surface of said parison; and a plurality of mold sections which may be assembled to define a mold cavity for said parison, each of said mold sections having a predetermined molding surface and being so structured that a flash-forming recess is defined along a joint line between two adjacent mold sections, when assembled, for forming a flash having a film of separating agent sandwiched therein and extending from an inside surface of said parison into said flash beyond an edge of each corresponding product, said edge being defined during subsequent flash removal.

2. Apparatus of claim 1, wherein said flash-forming recess is provided along the joint line of at least either one of the two adjacent mold sections.

3. Apparatus of claim 2, wherein a knife edge is formed at a corner of said flash-forming recess.

4. Apparatus of claim 1, wherein said nozzle comprises an outer cylinder an inner cylinder which is housed in said outer cylinder, whereby a gap between said two cylinders defines a passage for parison material and said separating agent is supplied into said parison through said inner cylinder.

5. Apparatus of claim 1, wherein said separating agent supplying means includes means for atomizing said separating agent.

6. Apparatus of claim 5, wherein said separating agent is oil.

* * * * *